Aug. 14, 1962  A. MAZZI ETAL  3,049,259
CUPPED TRAY FOR HOLDING FRUITS AND THE LIKE
Filed June 29, 1960  4 Sheets-Sheet 1

INVENTORS
Angelo Mazzi
Tullio Mazzi
By *Holcomb, Wetherill & Brisebois*
ATTORNEYS

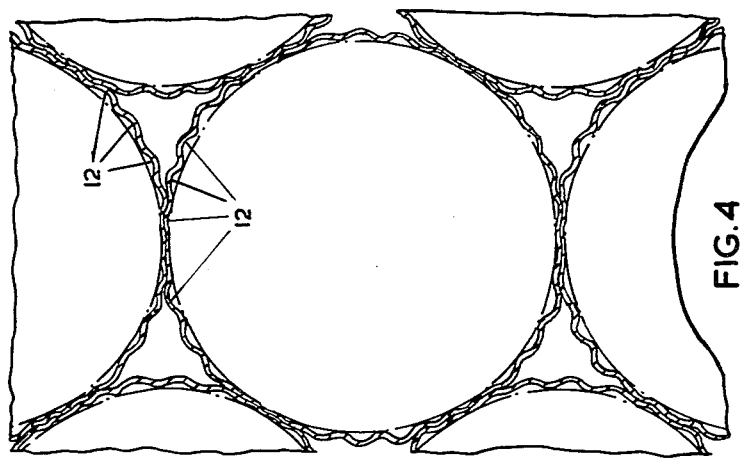
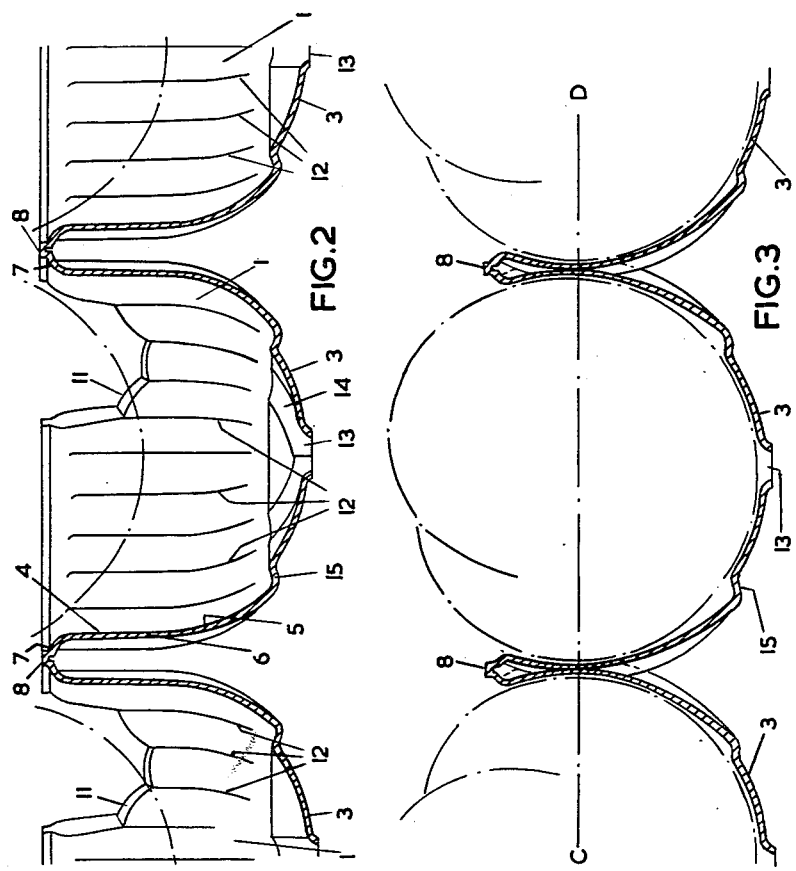

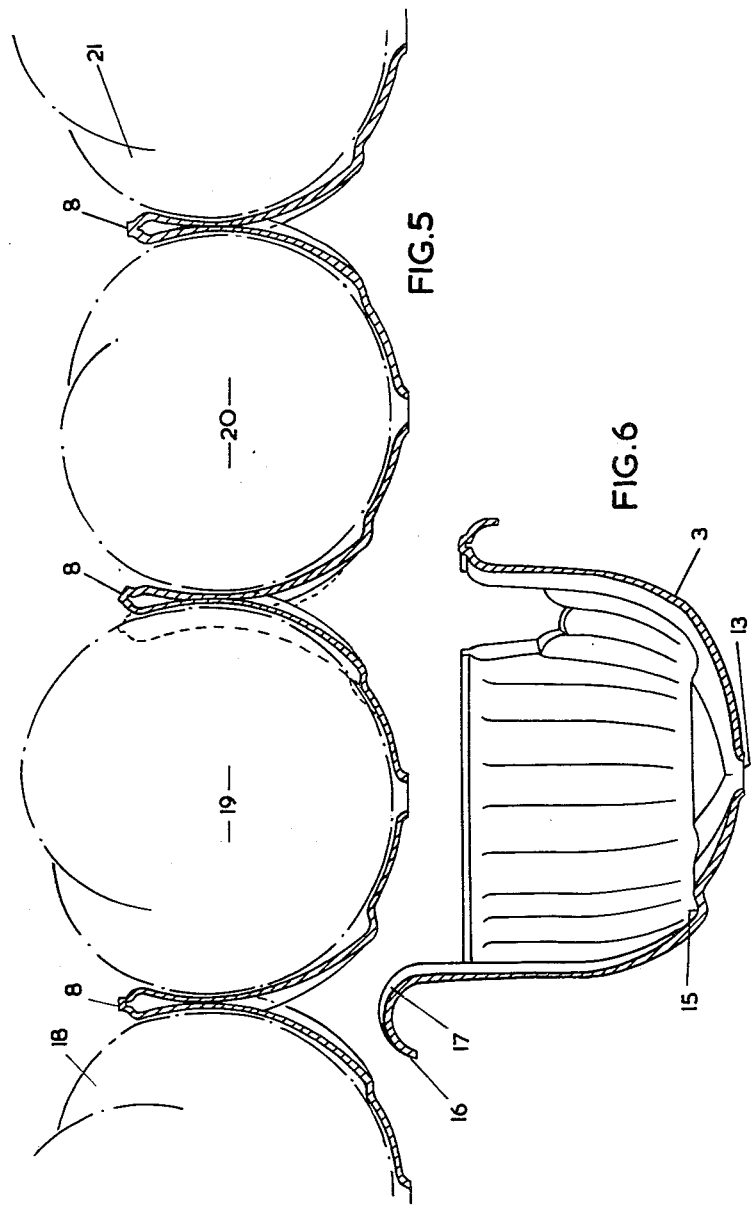

United States Patent Office 3,049,259
Patented Aug. 14, 1962

3,049,259
CUPPED TRAY FOR HOLDING FRUITS
AND THE LIKE
Angelo Mazzi and Tullio Mazzi, both of
58 Via Caprera, Verona, Italy
Filed June 29, 1960, Ser. No. 39,566
6 Claims. (Cl. 217—26.5)

The invention relates to a despatch tray, in particular for fruit, made of a thin material which, while it is rigid to some extent is nevertheless flexible, such as, for example, a thin plastics foil or a cellulose hydrate foil, or else a thin metal foil, which material can be shaped by drawing, pressing or extrusion moulding to form a cupped or recessed tray. The cupped tray is placed in a strong container, for instance a slatted wooden box. It accommodates the fruit and the like to be despatched in the slatted wooden box and keeps the individual fruits securely at a distance from one another on the one hand and free from the action of any harmful pressure on them on the other hand.

Such cupped trays comprise a number of cups into which the individual fruits are placed. The cups are arranged in rows which are staggered in relation to one another.

Cupped trays are known having hollow bulges of frustoconical or truncated pyramid shape arranged between the cups, said bulges having the function of holding the inserted fruits by a clamping action.

Such cupped trays have considerable drawbacks, since the clamping action of the bulges, which, according to a known proposal, should be stiffened, causes damage to the fruit by too great a pressure, in particular if these bulges are connected to one another by means of recessed strips or bridges having a stiffening effect and, on the other hand, because the bulges provided between the compartments or cells constitute a not inconsiderable proportion of the total area available, so that the slatted box accommodates less fruit than if the individual fruits, wrapped in paper, for example, are placed side by side in the slatted box.

These drawbacks are avoided in the cupped tray according to the invention in that the upper part of the cups, which are arranged in manner known per se in rows staggered with respect to one another, is given a non-circular, polygonal cross section, in particular a hexagonal cross section, and the cups, that is the rows of cups, are arranged so close to one another that no hollow bulges are left between them, but they are defined in relation to one another solely by the angular, diagonally extending edges of the folds in the foil between the cups.

In a cupped tray according to this arrangement, the clamping action on the inserted objects, in particular fruit, is exerted by the side walls of the cups. The thickness of these cup walls is so small that they adapt themselves to the round cross section of the inserted fruit, despite the polygonal, and more particularly hexagonal, cross section of the upper edge of the cups.

In this way, while the individual fruits are securely seated in the cups, the exertion of too strong a clamping effect, which could cause pressure marks or bruises and damage in the case of delicate fruits, such as, for instance, peaches, is avoided, and moreover the result is obtained that more fruit can be accommodated, for the same size, in the cupped tray, and, therefore, in the slatted box than in the case of the known division into cups and bulges.

According to one feature of the invention, the foil walls are welded to one another at the edge of the folds, preferably at points disposed at a distance from one another, or are provided with indentations or flutes. In this way, the angular diagonally extending fold edges defining the cups with respect to one another at the height of the plane of the cupped tray are reinforced in such manner that the cupped tray has a greater rigidity diagonally of said cupped tray than longitudinally and transversely thereof.

According to another feature of the invention, the angular fold edges separating the cups from one another are formed in continuous fashion at the height of the cupped tray only in one of the diagonal directions and are preferably reinforced by welding, in particular at separate points, while in the other diagonal direction angular fold edges of continuous height and/or welding of the walls of the folds in the foil at these edges are avoided. Preferably, reduced or recessed portions extending to about half the height of the cups (measured from the base of the cup to the maximum height of the cupped tray, that is to the height of the continuous angular diagonal fold edge) are provided in these fold edges separating the cups from one another, any stiffening effect on the part of these reduced portions being avoided.

In this way, the result is obtained that the cupped tray is stiffened only in one of the diagonal directions by means of angular fold edges extending at the height of the cupped tray and separating the cups from one another, which fold edges are preferably stiffened by welding the fold at the top, preferably at points separated from one another, while in the other of the two diagonal directions such stiffening is avoided by means of said reduced portions and by preventing any stiffening action by the latter, which is achieved, for example, by welding the foils only at the lowest point of the reduced portion or keeping the walls of these reduced portions apart in such manner that welding together thereof does not occur.

These reduced portions which neutralise or substantially reduce the rigidity of the fold edges of the boundaries of the cups and which favour the insertion of the individual fruits in the cups and the alteration of the shape of the cup walls and produce a clamping action in a preferred direction, moreover permit an improvement in the ventilation of the inserted fruit and facilitation of removal of the individual fruits from their seats.

At the marginal portions, recesses are provided at places corresponding to said reduced portions, said recesses promoting ventilation at these places.

According to another feature of the invention, the walls of the cups at the places located a little below the fold edges have a thickness which is smaller than the thickness of those parts of the walls of the cup which are disposed lower down, as seen from these places, and in particular a thickness smaller than that of the base of the cup. Preferably, the wall thickness in the vicinity of the fold edges, at the base of the cup and at the places where the reduced portions are located is approximately the same, while the wall thickness of the places below the fold edges is smallest. The parts of the cup which are of maximum diameter and/or minimum wall thickness are preferably disposed in the region extending from one quarter to three quarters of the total depth of the cup below the continuous fold edge.

The greater wall thickness in the base portion of the cup provides a secure seat for the inserted fruit and prevents any damage by the bottom of the slatted box, without stiffening the whole cupped tray undesirably.

According to another feature of the invention, the cups, which are of angular, and in particular hexagonal, cross section at the top portion, are so shaped that the base portion is circular.

According to a further feature of the invention the cups are so shaped that the cross section of the cup below the boundary edges of the cups is larger than at the level of said boundary edges, so that the cups are given a vase shape or bag shape.

Owing to the fact that, according to one feature of the invention the fold edges between the cups (angled according to the angular shape of the cups in the upper portion) extend continuously at the height of the cupped tray only in one diagonal direction without any reduced portions and provide a stiffening effect, while in the other diagonal direction stiffening by fold edges extending unreduced is avoided, for example by recessing these boundary edges without any welding of the walls at the places where the recessed or reduced portions are located, that is at these boundary portions of the adjacent cups, which welding would result in undesirable stiffening, not only is expansion of the cupped tray made possible in this diagonal direction, but it is moreover made possible to place in the vase-shaped or bag-shaped cups fruits whose diameter may be larged than the top opening of the cup, so that these fruits are supported by the walls of the cup at places located a little below the top level of the cupped tray, which are preferably relatively thinner in this region, the cups having the maximum cross section in this region, and/or by the base of the cup, without the top edges of the cups or the reduced portions being able to damage the inserted fruit.

In the production of such cupped trays in manner known per se, for example by a drawing process or a stamping process, such an adjustment of the wall thickness can be produced by suitable control and heating or cooling of the upper and lower dies.

According to another feature of the invention downwardly extending ventilation ducts which extend upwardly beyond the place at which the fruit is held by the walls of the cup are provided in said walls of the cup and the base portion of the latter is provided at the rim with an annular groove and also with radial grooves, for example three such grooves, which are in communication with a perforation in the base of the cup, so that air can flow through this perforation, the radial grooves, the annular groove and the ducts or furrows in the cup walls. The ventilation ducts in one cup may be off-set with respect to the ducts in the walls of the adjacent cup.

The grooves in the base portion of the cup may be formed in the shape of a star, for example with three rays, starting from the centre of the base portion, it being possible for the perforation in the base which is connected to these grooves in the base portion to be arranged centrally or eccentrically, but always in such manner that it is so connected to the grooves that the passage of air along the underside of the inserted fruits and through the ducts in the side walls is not impeded.

These grooves may be off-set in the individual rows by one third part of a complete revolution with respect to one another.

According to another feature of the invention a reinforced cupped tray is formed by placing two or more cupped trays one inside the other, in particular if each cupped tray consists of a particular thin foil and reinforcement is desirable, for example having regard to the weight of the inserted fruits. By the insertion of one cupped tray in a second, for example different-coloured but otherwise like, cupped tray, a double or multiple tray is obtained which has a relatively great load capacity without exhibiting a rigidity harmful to the inserted fruits, since the small wall thickness of the foils prevents any undesirable stiffening of the double or multiple wall.

As compared with the known cupped trays for the despatch of fruit or similar delicate foods of substantially spherical shape, a cupped tray made according to the invention affords the following advantages.

The fruits are supported resiliently by a large part of their surface in separate compartments, rolling or jumping of the fruits in the recesses being prevented. The fruits can be so placed in the recesses that their surfaces do not come into contact with parts having sharp corners or edges or which are so rigid that they might damage the skin of the fruits (such as peaches or apricots, which have a tender skin). Moreover, the advantage is obtained that waste of space between the fruit-filled cups of the tray is avoided, the cups having a considerable capacity for adaptations regards the size of the fruit.

Another advantage of the fruit holder according to the invention is that horizontal movements in the packing case, even of parts of the fruit holder, are impossible when the fruits are in the recesses.

The cupped tray according to the invention preferably comprises marginal strips which permit the passage of air from the space below the holder to the free atmosphere, ducts and perforations in the cups ensuring the sweeping of air along the surfaces of the fruit placed in the recesses.

In the drawings which illustrate preferred embodiments of the invention,

FIG. 2 is a section on the line A—B of FIG. 1, i.e. at right angles to the continuous angular fold edges;

FIG. 3 is the same section with the fruit inserted;

FIG. 4 is a section on the line C—D of FIG. 3;

FIG. 5 is a section on the line A—B of FIG. 1 showing inserted fruits of different sizes or diameters;

FIG. 6 is a section on the line E—F of FIG. 1, partly in side view through a cup.

Figure 1:
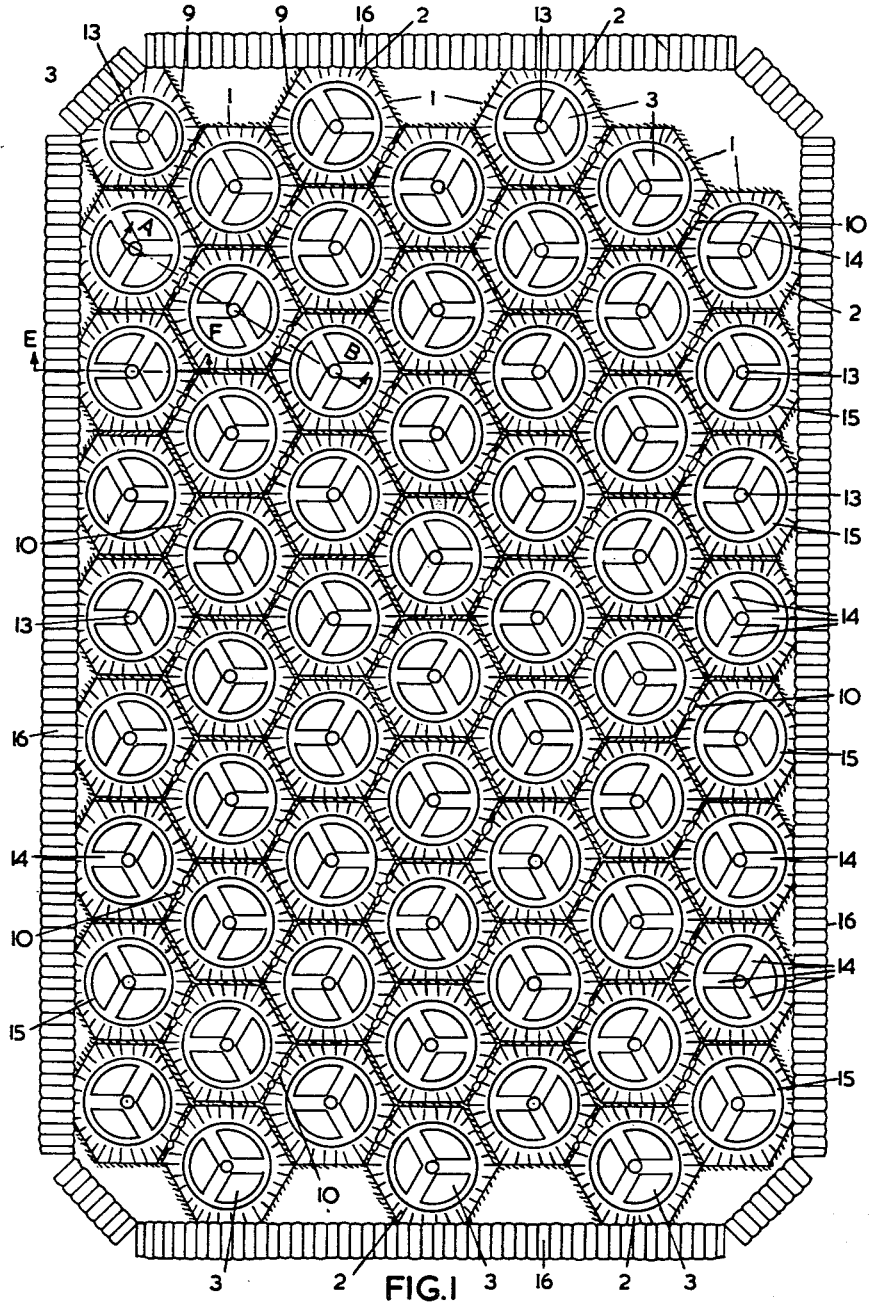
FIG. 1 is a plan view of a cupped tray according to a preferred embodiment of the invention.

Referring first to FIGS. 1 to 6, the cups 1 have a top opening 2 which is hexagonal in horizontal section and a circular base 3. The fruits are supported by a large part of their surface in hemispherical bowls.

The side wall 4 of each bowl-shaped or bag-shaped cup is widened outwardly in its lower portion 5 (see FIG. 2) while its middle portion 6, coinciding with the maximum circumference of the fruit, corresponds substantially to the top opening. The upper portion 7 is bent outwardly.

The cups are separated from one another by the doubled portions or the edges 8 of the doubled portions of the foil, which form an angular diagonal fold edge extending at the height of the cupped tray. This fold edge comprises reinforcing flutes or corrugations 9 which are disposed obliquely with respect to the width of the web. The separating edges 10 in the other diagonal line comprise reduced or recessed portions 11.

The cupped tray has its maximum wall thickness at the base of the cups and at the fold edges. The side wall of each cup is reduced gradually in thickness towards the middle portion, i.e. at the place where the largest circumference of the fruit would be located (see FIG. 2). The middle portion of the side wall is particularly flexible, while the other parts are elastic.

The middle portion of the side wall of the recesses has a substantially hexagonal shape in horizontal section, the distance between two opposite sides of the hexagon being smaller than the diameter of the fruit.

The fruit inserted in the cup is not in contact with the fold edges 8. (See the centre compartment in FIG. 2, which shows the fruit by a chain dotted line.)

In fact, when the fruit comes into contact with the vase-shaped or bag-shaped outwardly bent part of the recess, said part is pushed outwardly so that the fold edges bend a little. These fold edges 8 return to their natural position when the fruits are resting on the base of the cup and have enlarged the diameter of the cup by acting on the yielding side walls, in particular at the places corresponding to the maximum cross-section of the fruit.

The fold edges 8 hold the upper part of the cup together.

The reduced portions 11 are elastic and are spread apart when the fruits are inserted. They return to their normal position as soon as the fruits have been inserted in the cups. Thus, the reduced portions also assist in widening the openings in the cups for inserting the fruits and in returning the angular fold edges to their natural position after the fruits have been inserted in the cups.

The side walls of the cups 1 are provided with corrugations or grooves 12 which are so arranged that they form ventilation ducts extending between the walls and the fruits inserted in the cups. The base 3 of the cups is provided with perforations 13 in order to permit the entry of air which, by way of radial grooves 14, the annular groove 15 in the base of the cup and the ducts 12 in the cup walls, can sweep along between the walls of the cups and the fruits contained in the latter.

The fruit rests on a supporting base 17 of spherical shape whose function is assisted by the side walls of the cup, which side walls have a thickness which gradually becomes smaller from the base to the meridian and attain their maximum flexibility at the meridian. The fruits are held on this base owing to the action of the fold edges 8 and of the upper portion of the cup, which portion is bent outwardly in the form of a vase, so that jumping up of the fruits in the cups is prevented. This construction, together with the corrugations in the side walls, also prevents rotating movement of the fruit within the cup. The bag shape or vase shape of the cup prevents the fruit coming into contact with the fold edges.

The air ducts 12 along the side walls of the cups are arranged alternately in relation to the air ducts extending along the side walls of the contiguous cups, so that the inwardly extending curves of the grooves in the side walls of one cup are engaged over a certain distance in the outwardly extending curves of the grooves in the side walls of the contiguous cups. (See FIGS. 3 and 4.)

The grooves appear slightly undulated at the places of their maximum expansion, that is at the places of their maximum approach between one cup and another, by reason of the stretching which is caused by the fruit in the vicinity of its maximum diameter.

The cups 1' at the two lateral edges of the tray have a different cross-sectional shape. One of the corners of the hexagon is cut off in order to save space. Between the fruit placed in these marginal cups and the side walls of the protective packing case lies the side wall of the cup, which is provided with grooves which extend as far as the arched marginal strip 16, which has transverse folds 17 (see FIG. 6). The marginal strip 16 is devoid of bend lines or channels and in one piece with the tray, since it is not intended to facilitate upward bending of the marginal strip.

The cupped tray according to the invention is able to accommodate the same number of fruits as can be accommodated in a packing case without such a tray. All waste of useful space has been avoided.

It is known that before the fruit is packed for dispatch it is usually graded according to size and it is also known that the individual fruits of one and the same grade do not have exactly the same diameter and are not completely circular. These differences existing in the individual fruits even within the same grade require trays having cups with a great capacity for adaptation. According to the invention, this capacity of the cups for adaptation in the size of the individual fruits is created by the elasticity of the upper parts of the cups (vase-shaped outward curvature and fold edges), the yieldingness of the middle part of the side wall and the elasticity of the lower part of the sidewall of the cups.

The sorted out fruits or a grade placed in the cups (FIG. 5) have different diameters; the fruits 18 and 21 have a normal diameter, which corresponds approximately to the distance between the two opposite sides of the hexagon which is formed by the fold edges 8 of the cups, while the fruits 19 and 20 have the maximum diameter and the minimum diameter, respectively, of the grade. As is apparent from FIG. 5, the side wall of the cup containing the fruit 19 is displaced towards the cup containing the fruit 20 having the smallest diameter. In FIG. 5, the normal position of the side walls of the cups containing the fruits 19 and 20 is shown in broken lines, in order to demonstrate how the upper parts of the cups, containing fruit of small diameter, which parts are bent outwardly in vase shape, are so formed that jumping up of the fruit of small diameter in the cups during transport is prevented. Those fruits which have a diameter larger than the normal cause a displacement of the side wall of the cup in which they are seated towards the cups which have received fruit of smaller diameter than the normal, whereby a corresponding displacement of the adjacent cups results of necessity if they contain fruit of normal diameter.

Figure 7:
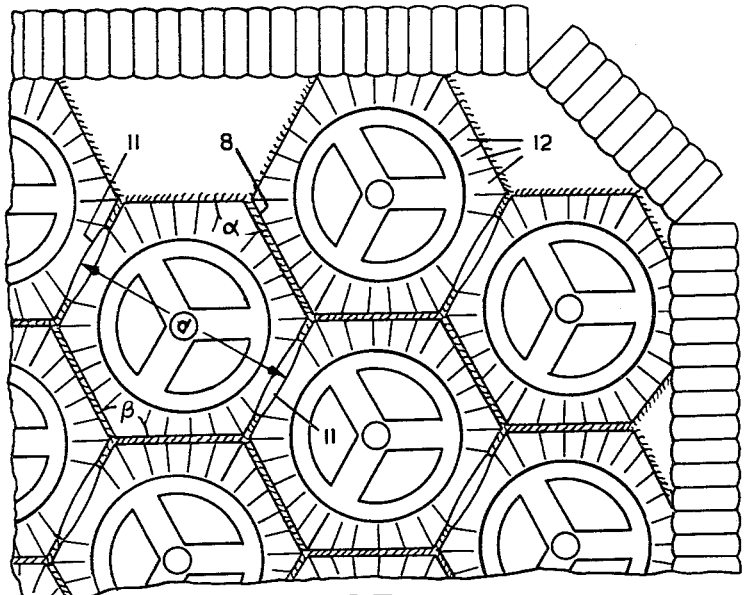
FIGS. 7 and 8 illustrate respectively modified constructions of the cups.
Figure 8:
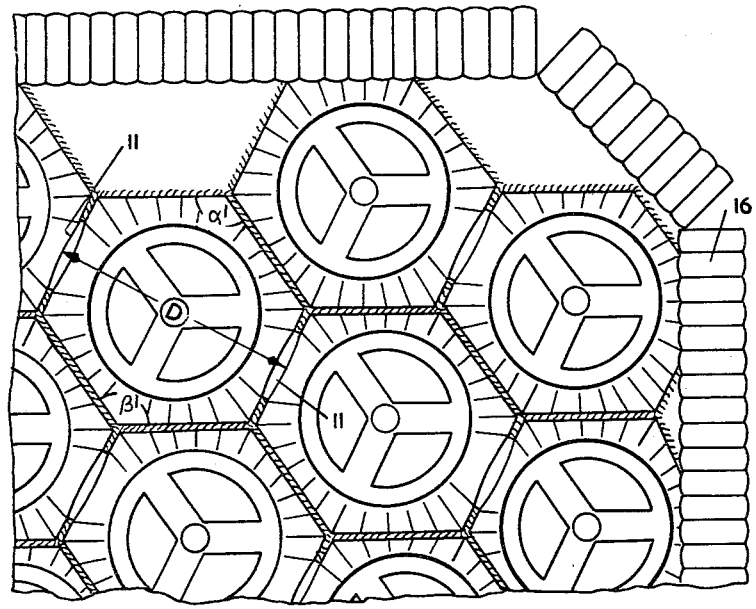

In order to increase the effect of the clamping of the individual fruits in the cups, the latter may be produced in accordance with FIGS. 7 and 8 of the drawings.

The cups shown in FIGS. 7 and 8 are generally similar to those shown in FIGS. 1 to 6 but differ in the following respects.

In FIG. 7, the upper part of each individual cup, which upper parts forms an almost regular hexagon in the construction shown in FIGS. 1 to 6, now forms a hexagon having two opposite angles denoted respectively $\alpha$ and $\beta$ each of smaller width than the remaining four angles of the hexagon which have a greater width than in the case of a regular hexagon. As the sides of the hexagon are equal to one another, the distance $d$ between the walls of the reduced or recessed portions 11 is smaller than that in the case of the regular hexagons of FIGS. 1 to 6. It is therefore clear that the distance $d$ is somewhat smaller than the equatorial diameter of the fruit which is to be accommodated in the cup.

In FIG. 8, the upper part of each individual cup forms a hexagon having two opposite angles denoted respectively $\alpha'$ and $\beta'$ each of greater width than the remaining angles, which in turn have a smaller width than that of a regular hexagon. As the sides of the hexagon are equal to one another, the distance D between the walls of the reduced or recessed portions 11 is larger than that in the case of the regular hexagons of FIGS. 1 to 6. It is therefore clear that the distance D is greater than the equatorial diameter of the fruit to be accommodated in the cup.

The insertion into the cups of fruits of almost spherical shape compels the upper portions of the cups having the irregular hexagonal form shown in FIGS. 7 and 8 to adopt the form of a regular hexagon.

In FIG. 7 an increase in the width of the angles $\alpha$, $\beta$ will be obtained and an appropriate reduction of the width of the remaining angles of the hexagon. In use, as each fruit is introduced into the cup it comes into contact with the outwardly bent portion 7 and effects the widening of the cup, so that the distance $d$ becomes somewhat larger than the equatorial diameter of the fruit, and then becomes equal again to said diameter as soon as the fruit is seated in the cup. In other words, on the introduction of a fruit into the cup, the sides of the hexagon move away from one another as regards the reduced or recessed portions 11 and the apices of the angles $\alpha$, $\beta$ approach one another. When the fruit approaches the base of the cup, the sides and the said apices move in the opposite direction, but to an extent less than that of the movement which took place previously. The remaining parts of the cup such as fold edge 8, reduced or recessed portions 11, middle portion 6 and lower portions 5 of the cups and the corrugations or grooves 12 behave entirely in the same manner as described before in the case of the type of fruit holder shown in FIGS. 1 to 6.

It is therefore obvious that the clamping of the fruits in the cups, considered individually, takes place in the same manner as above described in connection with FIGS. 1 to 6, but with a greater effect since the fold edges 8 are subjected to a greater tension and a clamping action also occurs with a special effect between the lower parts of the reduced or recessed portions 11, which was not the case in the fruit holder according to FIG. 1.

In order to avoid the fruit coming into contact with the fold edge when it is inserted in the cup, it will be sufficient to increase slightly the arc of the outwardly bent portion 7 or reduce the natural height of the fold edge 8.

In order to avoid the possibility that the lower parts of the reduced or recessed portions 11 may damage the skin of the fruit, they are designed as a flat arc with rounded corners.

In FIG. 8 when the fruit is inserted the cups behave similarly to the cups of FIG. 7, i.e. the sides of the hexagon approach one another as regards the reduced or recessed portions 11 until the distance D is somewhat smaller than the equatorial diameter of the fruit, and the apices of the angles α', β' move away from one another. When the fruit approaches the base of the cup, the sides and the said apices move in the opposite direction, but to a smaller extent.

The remaining parts of the cup shown in FIG. 8 behave similarly to the corresponding parts of the cups shown in FIGS. 1 to 6. In this case also, the greater effectiveness of the clamping action, which is to be attributed especially to the greater tension to which the fold edge is subjected, is obvious.

The same precautions described in connection with the fruit holder according to FIG. 7 also apply to the fruit holder according to FIG. 8, so as to avoid the fruit coming into contact with the fold edge and in order to prevent the possibility that the lower parts of the reduced or recessed portions may damage fruit having a tender skin.

In the case where contact of the fruit with the fold edge is not harmful to the skin of the fruit, the cup according to FIGS. 7 and 8 may also be produced without an outwardly bent portion, because the tension to which the fold edges are subjected is sufficient to ensure the fruit being held securely in the cup without the necessity for an outwardly bent portion between it and the fruit. In such cases the fold edge is connected directly to the middle portion of the side walls of the cup.

As soon as the cupped tray according to the invention has been inserted in the case and filled with fruit, it cannot suffer horizontal shifting, since the fruits are applied lightly one against the other and the fruits in the marginal cups are applied lightly against the side walls of the case.

What we claim and desire to secure by Letters Patent is:

1. A tray for holding fruits and the like said tray being made of thin foil material, and formed with a plurality of cups for receiving fruits and the like, each said cup having an upper part of polygonal cross section, said cups being arranged close to one another in staggered rows, adjacently disposed cups being separated from one another only by fold edges in the foil, said rows of cups extending diagonally across said tray in two directions, the fold edges extending in one direction in a zig-zag line being at the level of the tray and serving as stiffeners therefor while the fold edges extending in the other direction are recessed so that they do not similarly stiffen the tray, each of said cups having longitudinally extending grooves in its wall, a circular bottom wall having a centrally disposed air inlet aperture, an annular duct around its periphery communicating with said longitudinally extending grooves, and radial ducts, extending between said air inlet and said annular duct, whereby air entering through said inlet can pass along said radial ducts to said annular duct and from said annular duct to said longitudinally extending grooves and thus circulate uniformly around the fruit or the like in said cup.

2. A tray as claimed in claim 1 in which the fold edges which are at the level of the tray are reinforced by indentations.

3. A tray as claimed in claim 1 in which the lowest parts of the recessed fold edges are spot welded.

4. A cupped tray according to claim 1 in which the cups have an irregular hexagonal cross section.

5. A cupped tray according to claim 1 in which the cups are of hexagonal cross section and further in which two oppositely disposed angles of each cup are smaller than the remaining four angles.

6. A cupped tray according to claim 1 in which the cups are of hexagonal cross section and further in which two oppositely disposed angles of each cup are larger than the remaining four angles.

References Cited in the file of this patent

UNITED STATES PATENTS

| | | |
|---|---|---|
| D. 148,488 | Shank | Jan. 27, 1948 |
| 2,351,754 | Friday | June 20, 1944 |
| 2,429,063 | Jones | Oct. 14, 1947 |
| 2,922,541 | Martelli | Jan. 26, 1960 |

FOREIGN PATENTS

| | | |
|---|---|---|
| 962,237 | Germany | Apr. 18, 1957 |
| 1,032,161 | Germany | June 12, 1958 |
| 1,188,978 | France | Sept. 28, 1959 |
| 815,204 | Great Britain | June 17, 1959 |

UNITED STATES PATENT OFFICE
CERTIFICATE OF CORRECTION

Patent No. 3,049,259                      August 14, 1962

Angelo Mazzi et al.

It is hereby certified that error appears in the above numbered patent requiring correction and that the said Letters Patent should read as corrected below.

In the drawing, in Figure 1, the section line A-B should be shown as passing through the centers of the three upper cells of the second column of cells from the left in that figure.

Signed and sealed this 4th day of December 1962.

(SEAL)
Attest:

ERNEST W. SWIDER
Attesting Officer

DAVID L. LADD
Commissioner of Patents